United States Patent [19]
Kosaka et al.

[11] Patent Number: 5,744,568
[45] Date of Patent: *Apr. 28, 1998

[54] PROCESS FOR THE PRODUCTION OF POLYURETHANE LENS

[75] Inventors: Masahisa Kosaka; Yukio Kageyama, both of Tokyo, Japan

[73] Assignee: Hoya Corporation, Japan

[*] Notice: The term of this patent shall not extend beyond the expiration date of Pat. No. 5,635,580.

[21] Appl. No.: 802,800

[22] Filed: Feb. 18, 1997

Related U.S. Application Data

[62] Division of Ser. No. 559,632, Nov. 20, 1995, Pat. No. 5,635,580.

[51] Int. Cl.$^6$ ................................................. C08G 18/16
[52] U.S. Cl. ........................... 528/58; 528/65; 528/73; 528/81; 528/85; 351/159; 252/582; 264/1.1; 523/303
[58] Field of Search .................... 528/58, 65, 73, 528/81, 85; 351/159; 252/582; 264/1.1; 523/303

[56] References Cited

U.S. PATENT DOCUMENTS

| | | | |
|---|---|---|---|
| 3,058,955 | 10/1962 | Neumann et al. | 524/871 |
| 3,310,533 | 3/1967 | McElroy | 528/503 |
| 3,356,650 | 12/1967 | McElroy | 528/76 |
| 3,369,000 | 2/1968 | Blomeyer et al. | 528/48 |
| 3,640,965 | 2/1972 | Brode et al. | 528/74 |
| 3,799,972 | 3/1974 | Cawley et al. | 560/220 |
| 4,101,529 | 7/1978 | Ammons | 528/67 |
| 4,342,863 | 8/1982 | Hohokabe | 528/360 |
| 4,522,993 | 6/1985 | Sasagawa et al. | 523/106 |
| 4,542,201 | 9/1985 | Kanemura et al. | 526/314 |
| 4,632,969 | 12/1986 | Sasagawa et al. | 526/286 |
| 4,680,369 | 7/1987 | Kajimoto et al. | 528/76 |
| 4,689,387 | 8/1987 | Kajimoto et al. | 528/76 |
| 4,775,733 | 10/1988 | Kanemura et al. | 528/67 |
| 4,780,522 | 10/1988 | Kajimoto et al. | 528/76 |
| 4,791,185 | 12/1988 | Kanemura et al. | 528/73 |
| 4,929,707 | 5/1990 | Nagata et al. | 528/76 |
| 4,946,923 | 8/1990 | Nagata et al. | 528/76 |
| 4,975,328 | 12/1990 | Hirose et al. | 428/413 |
| 4,980,497 | 12/1990 | Sasagawa et al. | 560/33 |
| 5,013,496 | 5/1991 | Nagata et al. | 264/1.1 |
| 5,021,503 | 6/1991 | Nagata et al. | 524/706 |
| 5,059,673 | 10/1991 | Kanemura et al. | 528/67 |
| 5,084,538 | 1/1992 | Suzuki et al. | 526/261 |
| 5,084,545 | 1/1992 | Nagata et al. | 528/76 |
| 5,087,758 | 2/1992 | Kanemura et al. | 528/76 |
| 5,104,953 | 4/1992 | Sasagawa et al. | 526/301 |
| 5,126,388 | 6/1992 | Nagata et al. | 528/83 |
| 5,126,425 | 6/1992 | Sasagawa et al. | 528/58 |
| 5,145,927 | 9/1992 | Suzuki et al. | 526/301 |
| 5,166,285 | 11/1992 | Sasagawa et al. | 526/301 |
| 5,191,055 | 3/1993 | Kanemura et al. | 528/77 |
| 5,194,559 | 3/1993 | Okazaki et al. | 528/49 |
| 5,260,439 | 11/1993 | Suzuki et al. | 544/222 |
| 5,283,312 | 2/1994 | Kanemura et al. | 528/60 |
| 5,294,666 | 3/1994 | Okada et al. | 524/609 |
| 5,302,749 | 4/1994 | Nagata et al. | 560/333 |
| 5,306,799 | 4/1994 | Kobayashi et al. | 528/77 |
| 5,326,501 | 7/1994 | Ohkubo et al. | 252/582 |
| 5,352,758 | 10/1994 | Kanemura et al. | 528/85 |
| 5,374,668 | 12/1994 | Kanemura et al. | 523/451 |
| 5,389,708 | 2/1995 | Kusumoto et al. | 524/137 |
| 5,440,358 | 8/1995 | Suzuki et al. | 351/159 |

FOREIGN PATENT DOCUMENTS

| | | |
|---|---|---|
| 0 084 406 | 7/1983 | European Pat. Off. . |
| 0235743 | 9/1987 | European Pat. Off. . |
| 0271839 | 6/1988 | European Pat. Off. . |
| 0296502 | 12/1988 | European Pat. Off. . |
| 0330363 | 8/1989 | European Pat. Off. . |
| 0645647 A1 | 3/1995 | European Pat. Off. . |
| 0665219 A1 | 8/1995 | European Pat. Off. . |
| 0 768 169 A1 | 4/1997 | European Pat. Off. . |
| 47766 | 4/1979 | Japan . |
| 80428 | 5/1982 | Japan . |
| 57-136601 | 8/1982 | Japan . |
| 5-212732 | 8/1993 | Japan . |
| 7-104101 | 4/1995 | Japan . |
| 7-228659 | 8/1995 | Japan . |
| 7-247335 | 9/1995 | Japan . |
| 7-252341 | 10/1995 | Japan . |
| 2 093 843 | 9/1982 | United Kingdom . |

OTHER PUBLICATIONS

Encyclopaedia Chimica vol. 8, p. 760 Sep. 10, 1968 Polythiourethane (and translation).

Polymer Digest, vol. 36, No. 3, pp. 31–42 (1984) Development Trend and Problems of Resin Materials for Plastic Lenses (and translation).

Monthly Report of Japan Chemical Industry Association Dec. 1993 pp. 6–7 Development and the commercialization of urethane resins containing sulfur for spectacle lenses (and translation).

Hoshino et al Addition polymerization of diisocyanate and thioglycol (and translation), 1941.

I/EC Jul. 1960 vol. 52, No. 7, p. 609 Hostettler et al Organotin Compounds in Isocyanate Reactions.

*Primary Examiner*—Rachel Gorr
*Attorney, Agent, or Firm*—Nixon & Vanderhye

[57] ABSTRACT

The present invention relates to a process for the production of a polyurethane lens, which comprises the step (a) of providing a polyisocyanate compound and two or more polythiol compounds which have different reaction rates with the polyisocyanate compound and adding an alkyltin halide compound to the above polyisocyanate compound, and, after the step (a), the step (b) of mixing the polyisocyanate compound and the two or more polythiol compounds together with the alkyltin halide compound of the general formula (I) to allow them to react, and obtaining a polyurethane lens.

15 Claims, No Drawings

PROCESS FOR THE PRODUCTION OF POLYURETHANE LENS

This is a Division of application Ser. No. 08/559,632, filed Nov. 20, 1995, now U.S. Pat. No. 5,635,580.

BACKGROUND OF THE INVENTION

1. Field of the Invention

The present invention relates to a process for the production of a polyurethane lens.

2. Description of the Prior Art

It is disclosed in JP-A-63-130614 that, in the production of a polyurethane lens by reacting a polyisocyanate compound with a polythiol compound, a tetrafunctional polythiol compound such as pentaerythritol tetrakis (mercaptoacetate) or pentaerythritol tetrakis (mercaptopropionate) is used in combination with a difunctional polythiol compound having two thiol groups, for example, for increasing the crosslinking degree. It is also known that the reaction rate of one polythiol compound with a polyisocyanate compound differs from that of another. As a method of producing a polyurethane lens free of an optical strain from these two or more polythiol compounds, generally, there is employed a polymerization method in which the polymerization conditions are suited to a polythiol compound having a higher reaction rate with a polyisocyanate compound, the initial polymerization temperature is set at a low temperature and the polymerization temperature is gradually increased with taking time.

However, in the above polymerization method in which the polymerization conditions are suited to a polythiol compound having a higher reaction rate with a polyisocyanate compound, the initial polymerization temperature is set at a low temperature and the polymerization temperature is gradually increased with taking time, there is a problem in that the polymerization takes a long period of time to make the production efficiency poor. Further, when a lens having a large central thickness and a large marginal thickness is produced, for example, from pentaerythritol tetrakis (mercaptoacetate) (to be referred to as PETMA hereinafter) which has a high reaction rate with a polyisocyanate compound, the amount of PETMA increases, and the reaction heat generated by the reaction with a polyisocyanate compound increases. It is hence difficult to prevent the occurrence of an optical strain and striae by controlling the polymerization heat alone. There is therefore a disadvantage in that the yield of lenses per a polymerization furnace is limited in mass production.

SUMMARY OF THE INVENTION

The present invention has been made to overcome the above problems. It is an object of the present invention to provide a process for the production of a polyurethane lens, which serves to decrease the polymerization time for producing a polyurethane lens from a polyisocyanate compound and polythiol compounds and which permits the production of a lens free of an optical strain and striae with good producibility in producing plastic lens having a large central thickness and a large marginal thickness.

The above object and advantages of the present invention is achieved by a process for the production of a polyurethane lens, which comprises the following steps (a) and (b), step (a): providing a polyisocyanate compound and two or more polythiol compounds which have different reaction rates with the polyisocyanate compound, and adding an alkyltin halide compound of the general formula (I),

(I)

wherein $R_1$ is methyl, ethyl, propyl or butyl, X is a fluorine atom, a chlorine atom or a bromine atom and c is an integer of 1 to 3, to the above polyisocyanate compound, and step (b): after the above step (a), mixing the polyisocyanate compound and the two or more polythiol compounds together with the alkyltin halide compound of the general formula (I) to allow them to react, and obtaining a polyurethane lens.

DETAILED DESCRIPTION OF THE INVENTION

The present invention will be detailed hereinafter.

The process of the present invention comprises the steps (a) and (b). In the step (a), a polyisocyanate compound and two or more polythiol compounds which have different reaction rates with the polyisocyanate compound are provided, and an alkyltin halide compound of the general formula (I), $$(R_1)_c\text{—Sn—}X_{4-c}$$  (I)

wherein $R_1$ is methyl, ethyl, propyl or butyl, X is a fluorine atom, a chlorine atom or a bromine atom and c is an integer of 1 to 3, is added to the above polyisocyanate compound.

In the above step (a), it is required to add the alkyltin halide compound of the general formula (I) to a polyisocyanate compound. The reason therefor is as follows. A polyurethane lens having a large central thickness and a large marginal thickness has an optical strain when the alkyltin halide compound of the general formula (I) is added to a mixture of a polyisocyanate compound with polythiol compounds, while the above problem can be overcome when the alkyltin halide compound is added to a polyisocyanate compound before the polyisocyanate compound is mixed with polythiol compounds. Further, an alkyltin halide compound has poor solubility in a polythiol compound, while the alkyltin halide compound is easily soluble in a polyisocyanate compound. Therefore, the working is facilitated.

The polyisocyanate compound used in the step (a) is not specially limited. It can be properly selected from polyisocyanate compounds disclosed in JP-A-60-199016, JP-A-57-136601, JP-A-63-46213 and JP-A-1-302202.

Specific examples of the polyisocyanate compound include polyisocyanate compounds such as hexamethylene diisocyanate, isophorone diisocyanate, bis(isocyanatomethyl)cyclohexane, dicyclohexylmethane diisocyanate, cyclohexane diisocyanate, bis(isocyanatomethyl)bicycloheptane, xylylene diisocyanate, tetramethylxylylene diisocyanate, lysine ester triisocyanate, tris(isocyanatomethyl)cyclohexane, mesitylene triisocyanate, bicycloheptane triisocyanate and hexamethylene triisocyanate; allophanate-modified products, buret-modified products and isocyanurate-modified products thereof; and adducts thereof with polyols or polythiols. These polyisocyanate compounds may be used alone or in combination. Other known isocyanate compounds may be used, while the isocyanate compound as a main component is required to be difunctional or higher. Halogen atoms such as Cl or Br may be introduced into a known aliphatic isocyanate compound having an aromatic ring in its molecule. As the polyisocyanate compound, particularly preferred are bis(isocyanatomethyl)cyclohexane, bis(isocyanatomethyl)bicycloheptane and xylylene diisocyanate and mesitylene triisocyanate.

Examples of the combination of the two or more polythiol compounds used in the present invention are as follows.

(i) A combination of a polythiol compound ($S_1$) which is disclosed in JP-A-60-199016 and known to have a high reaction rate with a polyisocyanate compound, with a polythiol compound ($S_2$) which is disclosed in JP-A-63-46213 and known to have a relatively moderate reaction rate with a polyisocyanate compound.

The above polythiol compound ($S_1$) includes ethylene glycol dithioglycolate, trimethylolpropane tris (thioglycolate) and pentaerythritol tetrakis(thioglycolate).

The above polythiol compound ($S_2$) includes pentaerythritol tetrakis(mercaptopropionate), trimethylolpropane tris (mercaptopropionate), trimethylolethane tris (mercaptopropionate), dichloroneopentyl glycol bis (mercaptopropionate) and dibromoneopentyl glycol bis (mercaptopropionate).

(ii) A combination of the polythiol compound ($S_3$) of the general formula (II)

wherein $R_1$ is methyl or ethyl, a is an integer of 0 or 1, b is an integer of 3 or 4, and a+b=4, or the formula (III),

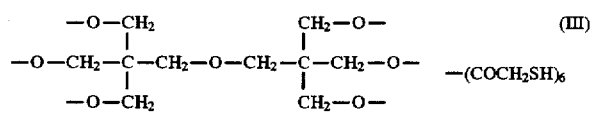

with a polythiol compound ($S_4$) which is disclosed in JP-A-3-236386 and has a relatively moderate reaction rate with a polyisocyanate compound.

The compound ($S_3$) which has the general formula (II) includes trimethylolpropane tris-(mercaptoacetate), trimethylolethane tris(mercaptoacetate) and pentaerythritol tetrakis(mercaptoacetate).

The compound ($S_3$) which has the general formula (III) is dipentaerythritol hexakis-(mercaptoacetate).

The compound ($S_4$) includes dimercaptomethyldithian.

The amount ratio of the two or more polythiol compounds which have different reaction rates with a polyisocyanate compound is not specially limited. The polythiol compound of the above general formula (II) or (III) which are known to have high reaction rates with a polyisocyanate compound may be added in an amount of at least 20 mol % based on the total amount of the polythiol compounds.

Whether or not the two or more polythiol compounds have different reaction rates with a polyisocyanate compound can be determined, for example, by the following method.

(i) m-Xylylene diisocyanate is selected as a standard polyisocyanate compound. One polythiol compound is mixed with m-xylylene diisocyanate in such amounts that the —NCO group/—SH group mixing ratio is 1.0. The mixture just after the mixture is prepared is measured for a viscosity at 20° C., and after 2 hours from the preparation of the mixture, the mixture is measured for a viscosity at 20° C. Then, an amount of viscosity change is determined.

(ii) Various polyisocyanate compounds are measured for amounts of viscosity change in the same manner as in the above (i).

(iii) Any two polythiol compounds are picked up, and compared with regard to the amount of viscosity change. When a difference between the amounts of viscosity change is at least 100 cps, the above two polythiol compounds are taken as compounds which have different reaction rates with a polyisocyanate compound.

The present inventors have found the following. In the step (a), when the alkyltin halide compound of the general formula (I) is added to a polyisocyanate compound, it can be easily dissolved in the polyisocyanate compound, and a plastic lens having a large central thickness and a large marginal thickness is remarkably free of an optical strain and striae even if the amount of monomers is large for producing such a plastic lens. Further, no precise temperature is required, and the polymerization time can be decreased. As a result, there is produced a remarkable effect that hundreds to thousands of lenses can be produced by the polymerization in a single polymerization furnace.

Examples of the alkyltin halide compound of the general formula (I) include monomethyltin trichloride, dimethyltin dichloride, trimethyltin chloride, dibutyltindichloride, tributyltin chloride, tributyltin fluoride and dimethyltin dibromide. Although differing depending upon the kinds of monomers and polymerization temperatures, the amount of the alkyltin halide compound based on the monomer mixture is 10 to 10,000 ppm, preferably 50 to 8,000 ppm. When the amount of the alkyltin halide compound is outside the range of from 10 to 10,000 ppm, it is difficult to adjust the polymerization rate, and produced lenses have optical strains and striae in many cases and are not suitable for optical use. It is preferred to add the alkyltin halide compound at a relatively low temperature, for example, 0° C. to room temperature.

According to the present invention, the above-described effects are accomplished by adding the alkyltin halide compound of the general formula (I), and the effects of the present invention cannot be accomplished by replacing the alkyltin halide compound with a conventional halogen-free tin compound, such as dibutyltin dilaurate which is equally used as a catalyst in the field of production of polyurethane lenses.

The alkyltin halide compound may be further added to that polythiol compound of the two or more polythiol compounds which has a lower reaction rate with a polyisocyanate compound.

For obtaining the preferred properties of a lens in refractive index and processability, the mixing ratio of the polyisocyanate compound and the polythiol compounds is set such that the (—NCO group)/(—SH group) molar ratio is preferably 0.9 to 1.2, particularly preferably 0.95 to 1.10.

Further, for improving a lens in weatherability, additives such as an ultraviolet light absorbent and an antioxidant may be added as required.

The step (b) of the present invention will be explained hereinafter.

The step (b) is a step in which, after the step (a), the polyisocyanate compound and the two or more polythiol compounds are mixed together with the alkyltin halide compound of the general formula (I), and the mixture is allowed to react to obtain a polyurethane lens.

The polymerization in the above step (b) is preferably carried out by degassing the mixture and then casting the mixture into a mold formed of mold members of glass or metal and gaskets of a resin. For improving the releasability between the mold and the resin of the molded lens, the mold may be treated with a mold releasing agent, or a mold releasing agent may be added to the monomers. Although differing depending upon the kinds of monomers used, generally, the polymerization time is 3 to 96 hours, and the polymerization temperature is 0° to 130° C.

The present invention will be further explained hereinafter with reference to Examples.

Example 1

Step (a)

0.01 part by weight of dimethyltin dichloride (to be referred to as "DMTDCl" hereinafter) was mixed with 94 parts by weight of xylylene diisocyanate (to be referred to as "XDI" hereinafter), and the mixture was stirred, at a room temperature of 15° C.

Step (b)

54 Parts of pentaerythritol tetrakis(mercaptoacetate) (to be referred to as "PETMA" hereinafter), 53 parts by weight of dimercaptomethyldithian (to be referred to as "DMMD" hereinafter) and 0.10 part by weight of a mixture of dibutoxyethyl acid phosphate with butoxyethyl acid phosphate were added to, and fully mixed with, the above mixture. In addition, a mixture of PETMA with XDI (—NCO group/ —SH group=1.0) was separately prepared as a model and measured for a viscosity just after the preparation of the mixture and after 2 hours from the preparation to show 45 cps and 450 cps, respectively, and the amount of viscosity change ($\Delta V_1$) was 415 cps. Further, a mixture of DMMD with XDI (—NCO group/—SH group=1.0) was separately prepared and measured for a viscosity just after the preparation of the mixture and after 2 hours from the preparation to show 12 cps and 13 cps, respectively, and the amount of viscosity change ($\Delta V_2$) was 1 cps. The difference between ($\Delta V_1$) and ($\Delta V_2$) was 414 cps, and it was determined that PETMA and DMMD had different reaction rates with XDI. Then, the above-obtained mixture was degassed under a pressure of 5 mmHg, cast into a mold formed of glass mold members and polyurethane gaskets, allowed to stand for a while, temperature-increased up to 120° C. over 12 hours, and heated at 120° C. for 3 hours, and the resultant lens was taken out of the mold. The mold had been formed of an upper mold member of glass having a curvature of 600 mm and a lower mold member of glass having a curvature of 120 mm such that the lens had a central thickness of 5 mm and a diameter of 75 mm. In this Example, 200 lenses were produced by the polymerization in a single polymerization furnace. The so-obtained lenses were evaluated, and Tables 1 and 2 show the results.

As shown in Tables 1 and 2, all the polyurethane lenses obtained in this Example were free of cludiness and also free of striae and an optical strain.

The evaluation standards and methods were as follows.

Refractive index·Abbe's number: Measured with an Abbe refractometer 2T supplied by ATAGO CORP. at 20° C.

Transparency: Lenses were visually observed under a fluorescence lamp in a dark place, and those free of the cloudiness of the lens and the precipitation of a translucent substance were rated as (A), and those having a distinct precipitation were rated as (X).

Heat resistance: Measured with a TMA apparatus supplied by Rigakusha. A chart was prepared by a TMA method (penetration method) using a pressure pin having a diameter of 0.5 mm at a temperature increase rate of 10° C./min. under a load of 10 g, and lenses were evaluated on the basis of the resultant chart peak temperatures.

Weatherability: Lenses were set in a weatherometer equipped with a sunshine carbon arc lamp, and allowed to stand for 200 hours. Then, the hue before the test and the hue after the test were compared. Concerning evaluation standards, those which had undergone almost no change were rated as (A), those which had slightly turned yellowish were rated as (B) and those which had turned yellowish were rated as (X). The evaluation of a lens as (B) means that the lens slightly turns yellowish but has no problem in practical use.

Optical strain: Lenses were visually observed with a strain scope. Those free of a strain were rated as (A), and those having strains were rated as (X).

Striae: Lenses were visually observed by the Schlielen method. Those almost free of striae were rated as (A), and those having striae were rated as (X).

Examples 2–21

Polyurethane lenses were obtained in the same manner as in Example 1 except that the composition of a polyisocyanate compound and polythiol compounds was changed as shown in Tables 1 and 2. Tables 1 and 2 also show the difference ($|\Delta V_1 - \Delta V_2|$) between the amounts of viscosity change, $\Delta V_1$ and $\Delta V_2$, of the two polythiol compounds. As shown in Tables 1 and 2, all the polyurethane lenses were free of cloudiness, striae and an optical strain.

Comparative Examples 1–4

Polyurethane lenses were obtained in the same manner as in Example 1 except that the alkyltin halide compound of the general formula (I) was replaced with dibutyltin dilaurate as shown in Table 3. As shown in Table 3, the so-obtained polyurethane lenses had an optical strain and striae to a great extent.

Comparative Example 5

Plastic lenses were obtained in the same manner as in Example 1 except that DMTDCl was added after XDI, PETMA and DMMD were uniformly mixed. As shown in Table 3, most of the so-obtained polyurethane lenses showed an optical strain and striae.

TABLE 1

| Example | Monomers | Viscosity difference $|\Delta V_1 - \Delta V_2|$ (cps) | Compositional ratio (parts by weight) | Catalyst/ amount (ppm) |
|---|---|---|---|---|
| 1 | XDI | 414 | 94 | DBTDCl/ |
|   | PETMA · DMMD |   | 54 · 53 | 1,200 |
| 2 | H$_6$XDI | 414 | 97 | DMTDCl/ |
|   | PETMA · DMMD |   | 54 · 53 | 1,000 |
| 3 | IPDI | 414 | 111 | DMTDCl/ |
|   | PETMA · DMMD |   | 54 · 53 | 1,500 |
| 4 | XDI | 449 | 94 | DBTDCl/ |
|   | DPETMA · DMMD |   | 116 · 53 | 200 |
| 5 | H$_6$XDI | 449 | 97 | DMTDCl/ |
|   | DPETMA · DMMD |   | 116 · 53 | 1,000 |

| | |
|---|---|
| XDI: | xylylene diisocyanate |
| DMMD: | dimercaptomethyl dithian |
| IPDI: | isophorone diisocyanate |
| H$_6$XDI: | bis(isocyanatomethyl)cyclohexane |
| DBTDCl: | dibutyltin dichloride |
| DMTDCl: | dimethyltin dichloride |
| PETMA: | pentaerythritol tetrakis-(mercaptoacetate) |
| DPETMA: | dipentaerythritol tetrakis-(mercaptoacetate) |
| PETMP: | pentaerythritol tetrakis-(mercaptopropionate) |
| DMMTP: | 2,3-dimercaptoethylthio-1-mercaptopropane |
| DBTL: | dibutyltin dilaurate |

| Example | Transparency | Refractive index/Abbe's number | Heat resistance | Weatherability | Striae | Strain |
|---|---|---|---|---|---|---|
| 1 | A | 1.64/34 | 110 | B | A | A |
| 2 | A | 1.60/42 | 118 | A | A | A |
| 3 | A | 1.60/42 | 141 | A | A | A |
| 4 | A | 1.63/34 | 112 | B | A | A |
| 5 | A | 1.60/42 | 121 | A | A | A |

TABLE 2

| Example | Monomers | Viscosity difference $|\Delta V_1 - \Delta V_2|$ (cps) | Compositional ratio (parts by weight) | Catalyst/ amount (ppm) |
|---|---|---|---|---|
| 6 | IPDI | 449 | 111 | DMTDCl/ |
|  | DPETMA · DMMD |  | 116 · 53 | 1,500 |
| 7 | XDI | 411 | 94 | DBTDCl/ |
|  | PETMA · PETMP |  | 54 · 51 | 100 |
| 8 | H₆XDI | 411 | 97 | DMTDCl/ |
|  | PETMA · PETMP |  | 54 · 61 | 1,000 |
| 9 | XDI | 412 | 94 | DBTDCl/ |
|  | PETMA · DMMTP |  | 54 · 43 | 200 |
| 10 | H₆XDI | 412 | 97 | DMTDCl/ |
|  | PETMA · DMMTP |  | 54 · 43 | 1,500 |
| 11 | H₆XDI | 447 | 97 | DMTDCl/ |
|  | DPETMA · DMMTP |  | 116 · 43 | 1,500 |

XDI: xylylene diisocyanate
DMMD: dimercaptomethyl dithian
IPDI: isophorone diisocyanate
H₆XDI: bis(isocyanatomethyl)cyclohexane
DBTDCl: dibutyltin dichloride
DMTDCl: dimethyltin dichloride
PETMA: pentaerythritol tetrakis-(mercaptoacetate)
DPETMA: dipentaerythritol tetrakis-(mercapto-acetate)
PETMP: pentaerythritol tetrakis-(mercaptopropionate)
DMMTP: 2,3-dimercaptoethylthio-1-mercaptopropane
DBTL: dibutyltin dilaurate

| Example | Trans- parency | Refractive index/Abbe's number | Heat resis- tance | Weather- ability | Striae | Strain |
|---|---|---|---|---|---|---|
| 6 | A | 1.60/43 | 144 | A | A | A |
| 7 | A | 1.60/35 | 100 | B | A | A |
| 8 | A | 1.56/45 | 103 | A | A | A |
| 9 | A | 1.64/34 | 100 | B | A | A |
| 10 | A | 1.60/42 | 103 | A | A | A |
| 11 | A | 1.60/42 | 105 | A | A | A |

TABLE 3

| Comparative Example | Monomers | Compositional ratio (parts by weight) | Catalyst/ amount (ppm) |
|---|---|---|---|
| 1 | XDI | 94 | DBTL/ |
|  | PETMA · DMMD | 54 · 53 | 200 |
| 2 | XDI | 94 | DBTL/ |
|  | PETMA · PETMP | 54 · 61 | 500 |
| 3 | IPDI | 111 | DBTL/ |
|  | DPETMA · DMMD | 116 · 53 | 5,000 |
| 4 | H₆XDI | 97 | DMTL/ |
|  | PETMA · DMMTP | 54 · 43 | 5,000 |
| 5* | XDI | 94 | DBTDCl/ |
|  | PETMA · DMMD | 54 · 53 | 200 |

XDI: xylylene diisocyanate
DMMD: dimercaptomethyl dithian
IPDI: isophorone diisocyanate
H₆XDI: bis(isocyanatomethyl)cyclohexane
DBTDCl: dibutyltin dichloride
DMTDCl: dimethyltin dichloride
PETMA: pentaerythritol tetrakis-(mercaptoacetate)
DPETMA: dipentaerythritol tetrakis-(mercapto-acetate)
PETMP: pentaerythritol tetrakis-(mercaptopropionate)
DMMTP: 2,3-dimercaptoethylthio-1-mercaptopropane
DBTL: dibutyltin dilaurate

*Comparative Example 5 differed from Examples 1 to 11 in that DBTDCl was added after XDI, PETMA and DMMD were mixed.

TABLE 3-continued

| Comparative Example | Monomers | Compositional ratio (parts by weight) | Catalyst/ amount (ppm) |
|---|---|---|---|

| CEx. | Trans- parency | Refractive index/Abbe's number | Heat resis- tance | Weather- ability | Striae | Strain |
|---|---|---|---|---|---|---|
| 1 | A | 1.64/34 | 100 | B | X | X |
| 2 | A | 1.63/34 | 112 | B | X | X |
| 3 | A | 1.60/42 | 144 | A | X | X |
| 4 | A | 1.60/42 | 103 | A | X | X |
| 5* | A | 1.64/34 | 110 | B | X | X |

CEx. = Comparative Example

According to the process for the production of a polyurethane lens, provided by the present invention, polyurethane lenses remarkably free of an optical strain can be mass-produced even if the polyurethane lenses have a large central thickness and a large marginal thickness.

What is claimed is:

1. A process for mass-producing a polyurethane lens comprising the steps of:

(A) selecting two polythiol compounds which have different reaction rates with a polyisocyanate compound by:

(i) mixing a first candidate polythiol compound with m-xylylene diisocyanate, as a standard polyisocyanate compound, in an —NCO group/—SH group mixing ratio of 1.0, measuring the viscosity of the resultant mixture at 20° C. immediately after mixing and again 2 hours after preparation of the mixture, and determining a change in viscosity between the first and second measurements, (ii) mixing a second candidate polythiol compound with m-xylylene diisocyanate and measuring viscosity change in the same manner as in the above step (i), (iii) repeating step (ii) for additional candidate polythiol compounds, and (iv) comparing the amount of viscosity change for any two polythiol compounds so measured, and when a difference between the viscosity change is at least 100 cps, selecting these two candidate polythiol compounds which have different reaction rates with the standard polyisocyanate compound;

(B) adding two or more of the polythiol compounds selected in step (A) to a mixture of polyisocyanate compound and an alkyltin halide compound of the formula (I),

$$(R_1)_c\text{—Sn—}X_4\text{—}c \qquad (I)$$

wherein $R_1$ is methyl, ethyl, propyl or butyl, X is a fluorine atom, a chlorine atom or a bromine atom and c is an integer of 1 to 3, (C) pouring the resulting mixture of step (B) into a plurality of lens molds and allowing the mixture to react;

(D) heating the filled lens molds of step (C) in the same polymerization furnace; and thereafter (E) obtaining a plurality of transparent polyurethane lenses.

2. The process of claim 1, wherein one or more additional isocyanate compounds are used.

3. The process of claim 1, wherein the polyisocyanate compounds is, or the polyisocyanate compounds are, selected from the group consisting of (i) a polyisocyanate compound selected from the class consisting of hexamethylene diisocyanate, isophorone diisocyanate, bis(isocyanatomethyl)cyclohexane, dicyclohexylmethane diisocyanate, cyclohexane diisocyanate, bis(isocyanatomethyl)bicycloheptane, xylylene diisocyanate, tetramethylxylylene diisocyanate, lysine ester triisocyanate, tris(isocyanatomethyl)cyclohexane, mesitylene triisocyanate, bicycloheptane triisocyanate and hexamethylene triisocyanate;

(ii) a modified product selected from the class consisting of an allophanate-modified product, a buret-modified product and an isocyanurate-modified product of the polyisocyanate compound (i), and (iii) an adduct of the compound (i) or (ii) with a polyol or a polythiol.

4. The process of claim 1, wherein one of the two or more polythiol compounds is a polythiol compound ($S_1$) selected from the group consisting of ethylene glycol dithioglycolate, trimethylolpropane tris(thioglycolate) and pentaerythritol tetrakis(thioglycolate) and the other polythiol compound is, or the other polythiol compounds are, polythiol compound(s) ($S_2$) having a lower reaction rate with the polyisocyanate compound than the polythiol compound ($S_1$).

5. The process of claim 4, wherein the polythiol compound(s) ($S_2$) is/are selected from the group consisting of pentaerythritol tetrakis(mercaptopropionate), trimethylolpropane tris(mercaptopropionate), trimethylolethane tris(mercaptopropionate), dichloroneopentyl glycol bis(mercaptopropionate) and dibromoneopentyl glycol bis(mercaptopropionate).

6. The process of claim 1, wherein one of the two or more polythiol compounds is a polythiol compound ($S_3$) of the following general formula (II) or the following formula (III),

$(R_1)_a$—$C(CH_2OCOCH_2SH)_b$ (II)

wherein $R_1$ is methyl or ethyl, a is an integer of 0 or 1, b is an integer of 3 or 4, and a+b=4,

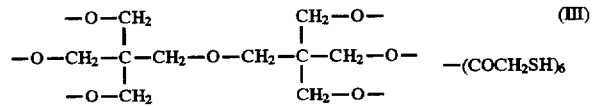

and the other polythiol compound is, or the other polythiol compounds are, polythiol compound(s) ($S_4$) which has or have lower reaction rate(s) with the polyisocyanate compound than the polythiol compound ($S_3$) of the general formula (II) or the formula (III).

7. The process of claim 6, wherein the polythiol compound ($S_3$) of the general formula (II) is selected from the group consisting of trimethylolpropane tris(mercaptoacetate), trimethylolethane tris(mercaptoacetate) and pentaerythritol tetrakis(mercaptoacetate).

8. The process of claim 6, wherein the polythiol compound ($S_3$) of the general formula (III) is dipentaerythritol hexakis(mercaptoacetate).

9. The process of claim 6, wherein the polythiol compound ($S_4$) is dimercaptomethyl dithian.

10. The process of claim 1, wherein the alkyltin halide compound of the general formula (I) is selected from the group consisting of monomethyltin trichloride, dimethyltin dichloride, trimethyltin chloride, dibutyltin dichloride, tributyltin chloride, tributyltin fluoride and dimethyltin dibromide.

11. The process of claim 10, wherein the alkyltin halide compound is added to a monomer mixture in an amount of 10 to 10,000 ppm based on the monomer mixture.

12. The process of claim 1, wherein the alkyl tin halide compound is further added to the polythiol compound which has a lower reaction rate with the polyisocyanate compound, among the two or more polythiol compounds.

13. The process of claim 1, wherein the polyisocyanate compound and the polythiol compounds are used in an (—NCO group)/(—SH group) molar ratio of 0.9 to 1.2.

14. The process of claim 1, wherein a mixture obtained in the step (a) is degassed before carrying out the step (b).

15. The process of claim 1, wherein the reaction for polymerization is carried out for 3 to 96 hours at a temperature of 0° to 130° C.

* * * * *

UNITED STATES PATENT AND TRADEMARK OFFICE
CERTIFICATE OF CORRECTION

PATENT NO. : 5,744,568
DATED : April 28, 1998
INVENTOR(S) : Kosaka et al

It is certified that error appears in the above-identified patent and that said Letters Patent is hereby corrected as shown below:

Column 3, line 56, delete "Various polyisocyanate compounds" insert --Various polythiol compounds--.

Signed and Sealed this

Third Day of August, 1999

Attest:

Q. TODD DICKINSON

*Attesting Officer*  *Acting Commissioner of Patents and Trademarks*